(12) United States Patent
Chang et al.

(10) Patent No.: US 11,009,061 B2
(45) Date of Patent: May 18, 2021

(54) HIDDEN TYPE SPLIT HINGE

(71) Applicant: Jarllytec Co., Ltd., New Taipei (TW)

(72) Inventors: Jui-Hung Chang, New Taipei (TW); Hsin-Chung Chang, New Taipei (TW)

(73) Assignee: Jarllytec Co., Ltd., New Taipei (TW)

( * ) Notice: Subject to any disclaimer, the term of this patent is extended or adjusted under 35 U.S.C. 154(b) by 82 days.

(21) Appl. No.: 16/563,231

(22) Filed: Sep. 6, 2019

(65) Prior Publication Data
US 2020/0392983 A1    Dec. 17, 2020

(30) Foreign Application Priority Data

Jun. 14, 2019 (TW) .................................. 108120779

(51) Int. Cl.
| G06F 1/16 | (2006.01) |
|---|---|
| F16C 11/04 | (2006.01) |
| E05D 3/14 | (2006.01) |
| E05D 3/18 | (2006.01) |
| E05D 11/06 | (2006.01) |

(52) U.S. Cl.
CPC .............. *F16C 11/04* (2013.01); *E05D 3/14* (2013.01); *E05D 3/18* (2013.01); *E05D 11/06* (2013.01); *G06F 1/1681* (2013.01); *E05Y 2201/224* (2013.01); *E05Y 2900/606* (2013.01)

(58) Field of Classification Search
CPC . F16C 11/04; E05D 11/06; E05D 3/14; E05D 3/18
See application file for complete search history.

(56) References Cited

U.S. PATENT DOCUMENTS

| 10,143,098 | B1* | 11/2018 | Lee | ........................ E05D 3/18 |
|---|---|---|---|---|
| 10,520,992 | B1* | 12/2019 | Chang | ................... G06F 1/1616 |
| 2009/0064459 | A1* | 3/2009 | Chang | ................... G06F 1/1681 |
| | | | | 16/321 |
| 2014/0174227 | A1* | 6/2014 | Hsu | ........................ E05D 3/14 |
| | | | | 74/98 |
| 2014/0196254 | A1* | 7/2014 | Song | ....................... E05D 3/14 |
| | | | | 16/302 |

(Continued)

FOREIGN PATENT DOCUMENTS

| CN | 205353861 U | 6/2016 |
|---|---|---|
| CN | 207018340 U | 2/2018 |

*Primary Examiner* — Jason W San
(74) *Attorney, Agent, or Firm* — Muncy, Geissler, Olds & Lowe, P.C.

(57) ABSTRACT

The present invention provides a hidden type split hinge. First and second curved tracks are provided on a curved seat body for respectively limiting a first and second curved blocks of first and second rotating members in a way of being relatively swung. First and second torsion units are symmetrical and adjacently provided to a first side of the curved seat body, and one end of the first and second torsion units is respectively provided with first and second pivoting holes, and the first and second pivoting holes are respectively in communication with first and second elongated opening holes, first and second tooth portions are respectively provided around peripheries of the first and second pivoting holes, and the first tooth portion is engaged with the second tooth portion, and the first and second pivoting hole are axially connected to the first and second shaft ends of a first lateral surface.

12 Claims, 7 Drawing Sheets

(56) References Cited

U.S. PATENT DOCUMENTS

| | | | |
|---|---|---|---|
| 2015/0362956 A1* | 12/2015 | Tazbaz | G06F 1/1681 |
| | | | 361/679.27 |
| 2016/0215541 A1* | 7/2016 | Tazbaz | H04M 1/022 |
| 2016/0363964 A1* | 12/2016 | Shi | E05D 3/122 |
| 2017/0192467 A1* | 7/2017 | Holung | G06F 1/1654 |
| 2017/0208703 A1* | 7/2017 | Lin | H05K 7/16 |
| 2017/0227994 A1* | 8/2017 | Hsu | G06F 1/1652 |
| 2017/0269637 A1* | 9/2017 | Lin | G06F 1/1613 |
| 2020/0256099 A1* | 8/2020 | Lin | E05D 7/0009 |
| 2020/0275563 A1* | 8/2020 | Watamura | G06F 1/1652 |
| 2020/0359514 A1* | 11/2020 | Lin | G06F 1/1616 |
| 2020/0363843 A1* | 11/2020 | Cheng | G06F 1/1681 |
| 2020/0371561 A1* | 11/2020 | Lin | G06F 1/1681 |
| 2020/0383217 A1* | 12/2020 | Kim | E05F 1/1083 |
| 2020/0383219 A1* | 12/2020 | Hale | E05D 3/122 |

* cited by examiner

HIDDEN TYPE SPLIT HINGE

FIELD OF THE INVENTION

The present invention relates to a hinge, and more particularly to a hidden type split hinge for a foldable electronic device.

BACKGROUND OF THE INVENTION

For conventional foldable electronic devices, for example, for displays and bases of notebooks, a single-axial hinge is used to connect the bases with a side of the display to form a pivoting connection, so that the notebooks can be folded or unfolded. In addition to the conventional notebooks, especially for the existing dual-touch screen computers, the current foldable design is mainly to improve the shortcoming of the dual-touch screen computers. The two screens of the existing dual-touch screen computers, the two screens can be moved to approach each other during the folding process, so as to reduce the gap between them and to avoid exposure of the internal structures of hinges or pivot points.

For example, the Chinese Utility Model Patent entitled with "Hinge device and electronic apparatus using the same" (No. CN207018340U; Patent 1) has disclosed that its foldable electronic apparatus mainly includes two bodies and a hinge. The hinge includes a base frame, a transmission assembly and two brackets. The base frame is provided with two guiding grooves, and the two guiding grooves are arranged in a direction reverse to the front-to-rear direction and spaced from each other. The transmission assembly is provided on the base frame and partially located in the two guiding grooves. The two brackets are arranged in a direction reverse to the front-to-rear direction, and each bracket includes a curved frame body that is slidably connected to the corresponding guiding groove and connected to the transmission assembly, and a bracket body provided on the curved frame body in a protruding way and located outside the base frame. The two brackets are rotatable relative to the base frame around a rotating axis and are rotatable in a reverse direction when being driven by the transmission assembly.

Moreover, the Chinese Utility Model Patent entitled with "Novel rotating combined structure" (No. CN205353861U; Patent 2) has disclosed that its structure includes a bending member, a first torsion mechanism, a second torsion mechanism, a first gear, a second gear, a first movable plate and a second movable plate, wherein the first gear and the second gear are fixed to the interior of the bent member, the first torsion mechanism and the second torsion mechanism are disposed on one side of the bending member; the first gear is connected to the second gear in a driving way; the first movable plate is connected to the first gear in a transmission way, the second gear is connected to the second movable plate in a transmission way; the first movable plate is connected to the first torsion mechanism in a transmission way, and the second movable plate is connected to the second torsion mechanism in a transmission way. By means of the above structures, the combined member of Patent 2 can be simplified, has smaller friction coefficient and can be easily rotatable, and its rotating axis would not be loosened after repeated rotation, so as to effectively improve the service life of the rotating axis.

SUMMARY OF THE INVENTION

The two brackets of patent 1 are mainly engaged with the two transmission gear sets by two internal gear rings, and the two brackets are rotated in a direction reverse to the rotation of the transmission gear set, so as to proceed folding or unfolding. The first movable plate and the second movable plate of patent 2 are also provided with curved ribs and are respectively driven by the gears correspondingly engaged with the curved ribs, so as to produce the same rotating effect as that in patent 1. However, the use of internal teeth or ridges provided on curved plates not only increases the thickness of plates, but also increases the space for accommodating the plates, thereby the overall volume of hinges is increased, and cost of production will be increased in manufacturing process because it is required to improve precision. In view of this, in order to provide a structure different from prior art and to improve the above disadvantages, the inventor has continuously researched, and the present invention is provided.

An object of the present invention is to provide a hidden type split hinge, which can simplify the inner gear ring of patent 1 and the movable plate of patent 2 to remove the internal teeth or the rib structure, so as to reduce the overall thickness by reducing the thickness of each curved block and the size of the correspondingly-connected curved seat body. Such arrangement can reduce the overall thickness to improve the original design and to meet the marketing need of being thinner and lighter, so as to increase selling volumes. Moreover, for such arrangement, it is not required to consider the production precision of internal teeth or ripples, and such arrangement can reduce the components of the tooth structure, so as to reduce producing cost.

In order to fulfill above object, a hidden type split hinge of the present invention comprises a curved seat body, a first rotating member, a second rotating member, a first torsion unit and a second torsion unit. The curved seat body is provided with a first lateral surface and a second lateral surface opposite to the first lateral surface, wherein a first curved track and a second curved track are juxtaposed with and spaced from each other between the first lateral surface and the second lateral surface, and the first curved track and the second curved track have openings respectively in the same direction, and the first lateral surface has a first shaft end and a second shaft end. The first rotating member includes a first connecting portion and a first curved block, wherein the first connecting portion is connected to a first bracket, and the first connecting portion is provided with an elongated first guiding groove, and the first curved block is limited in and swung along the first curved track in a way of being relatively swung. The second rotating member includes a second connecting portion and a second curved block, wherein the second connecting portion is connected to a second bracket, and the second connecting portion is provided with an elongated second guiding groove, and the second curved block is limited in the second curved track in a way of being relatively swung. The first torsion unit is adjacently provided on the first lateral surface of the curved seat body, wherein a first pivoting hole and a first pivoting-connection hole are respectively provided at two ends of the first torsion unit, and the first pivoting hole is in communication with a first elongated opening hole, and a first tooth portion is provided around peripheries of the first pivoting hole, the first pivoting hole is axially connected to the first shaft end, and a first pivoting shaft is passed through the first pivoting-connection hole and the elongated first guiding groove of the first connecting portion. The second torsion unit is symmetrical with the first torsion unit, and adjacently provided on the first lateral surface of the curved seat body, wherein a second pivoting hole and a second pivoting-connection hole are respectively provided at two ends of the second torsion unit, wherein the second pivoting hole is in communication with a second elongated opening hole, and a second tooth portion is provided around peripheries of the second pivoting hole, and the second tooth portion is engaged with the first tooth portion, and the second pivoting hole is axially connected to the second shaft end, a second pivoting shaft is passed through the second pivoting-connection hole and the elongated second guiding groove of the second connecting portion.

In an implementation, the curved seat body includes a first lateral plate, an intermediate curved block and a second lateral plate that are sequentially connected, and the intermediate curved block is provided with the first curved track and the second curved track juxtaposed with and spaced from each other.

In an implementation, the intermediate curved block comprises a curved body and a cover plate, and the curved body is provided with a curved surface, and the first curved track and the second curved track are two grooves formed on the curved surface, and the cover plate covers and is connected to the curved surface.

In an implementation, the first shaft end and the third shaft end are respectively provided at two ends of the first shaft, and the first shaft is passed through the intermediate curved block, and the first shaft has a middle portion positioned in the intermediate curved block in an irrotational way.

In an implementation, the first shaft is provided with at least one first stopping portion, and at least one of two sides of the intermediate curved block is provided with a limiting groove for limiting the at least one first stopping portion, thereby the middle portion of the first shaft is positioned in the intermediate curved block in an irrotational way.

In an implementation, the second lateral surface of the curved seat body is provided with a third shaft end and a fourth shaft end, and a third torsion unit is adjacently provided on the second lateral surface of the curved seat body, and a third pivoting hole and a third pivoting-connection hole are respectively provided at the two ends of the third torsion unit, the third pivoting hole is in communication with a third elongated hole, and a third tooth portion is provided around peripheries of the third pivoting hole, and the third pivoting hole is axially connected with the third shaft end, and the first pivoting shaft is passed through the third pivoting-connection hole; a fourth torsion unit is symmetrical with the third torsion unit and adjacently provided on the second lateral surface of the curved seat body, a fourth pivoting hole and a fourth pivoting-connection hole are respectively provided at two ends of the fourth torsion unit; wherein the fourth pivoting hole is in communication with a fourth elongated opening hole, and a fourth tooth is provided around peripheries of the fourth pivoting hole, and the fourth tooth portion is engaged with the third tooth portion, the fourth pivoting hole is axially connected with the fourth shaft end, and the second pivoting shaft is passed through the fourth pivoting-connection hole.

In an implementation, the second shaft end and the fourth shaft end are respectively provided at two ends of a second shaft, the second shaft is passed through the intermediate curved block, and the second shaft has a middle portion positioned in the intermediate curved block in an irrotational way.

In an implementation, the second shaft is provided with at least one second stopping portion, and at least one of the two sides of the intermediate curved block is provided with a limiting groove for limiting the at least one second stopping portion, thereby the middle portion of the second shaft is positioned in the intermediate curved block in an irrotational way.

In an implementation, the third torsion unit includes a plurality of third plates that are transversely stacked, and the fourth torsion unit includes a plurality of fourth plates that are transversely stacked.

In an implementation, the first torsion unit includes a plurality of first plates that are transversely stacked, and the second torsion unit includes a plurality of second plates that are transversely stacked.

In an implementation, the second rotating member and the first rotating member are provided correspondingly on opposite lateral edges of the curved seat body, thereby an opening of the second curved block is opposite to an opening of the first curved block.

The present invention will be understood more fully by reference to the detailed description of the drawings and the preferred embodiments below.

DETAILED DESCRIPTIONS OF PREFERRED EMBODIMENTS

Please refer to FIGS. 1-4, which are preferred embodiments of a hidden type split hinge 1 of the present invention, including a curved seat body 2, a first rotating member 3, and a second rotating member 4, a first torsion unit 5, a second torsion unit 6, a third torsion unit 7, and a fourth torsion unit 8. A first connecting portion 31 of the first rotating member 3 is connected to a lateral surface of a first bracket 91 of a display of an electronic device, and the second connecting portion 41 of the second rotating member 4 is connected to a lateral surface of a second bracket 92 of a base of the electronic device, thereby when the first rotating member 3 and the second rotating member 4 are respectively rotated relative to each other around the curved seat body 2 as an axis, the display and the base are rotated in a reverse direction. In one embodiment, the first connecting portion 31 of the first rotating member 3 and the second connecting portion 41 of the second rotating member 4 are also respectively connected to the lateral surfaces of the two juxtaposed brackets of a dual-touch screen computer.

The curved seat body 2 includes a first lateral plate 21, an intermediate curved block 22 and a second lateral plate 23. The first lateral plate 21, the intermediate curved block 22 and the second lateral plate 23 are transversely connected in sequence. The outer lateral surface of the first lateral plate 21 is used as the first lateral surface 211, and the outer lateral surface of the second lateral plate 23 is used as the second lateral surface 231. The first lateral surface 211 and the second lateral surface 231 are opposite to the two lateral surface of the curved seat body 2. The intermediate curved block 22 includes a curved body 221 and a cover plate 222. The curved body 221 has a curved surface 223 having two curved grooves that are a minor segment in shape in a cross section view and juxtaposed with and spaced from each other. The two curved grooves are respectively formed as a first curved track 224 and a second curved track 225, and the left and right sides of the curved body 221 respectively are provided with a limiting groove 226. The cover plate 222 is a curved plate having the same curvature as the curved surface 223, and the cover plate 222 covers and is connected to the curved surface 223, thereby an opening of the first curved track 224 and an opening of the second curved track 225 have the same direction.

The first rotating member 3 includes a first connecting portion 31 that is in a flat shape and a first curved block 32 extending in a direction reverse to one end of the first connecting portion 31. The first connecting portion 31 has an elongated first guiding groove 311 extending through the left and right lateral surfaces of the first connecting portion 31, and the first curved block 32 is a curved plate a cross section view of which is a minor segment in shape, and the first curved block 32 is inserted and limited in the first curved track 224, thereby the first curved block 32 can be swung along the first curved track 224.

The second rotating member 4 and the first rotating member 3 are provided correspondingly on the front and rear lateral edges of the curved seat body 2 that are oppositely provided, and the second rotating member 4 includes a second connecting portion 41 in a flat shape and a second curved block 42 extending in a reverse direction from one end of the second connecting portion 41. The second connecting portion 41 has an elongated second guiding groove 411 extending through left and right lateral surfaces of the second connecting portion 41. The second curved block 42 is a curved plate a cross section view of which is a minor segment in shape, and the second curved block 42 is inserted and limited in the second curved track 225, thereby an opening of the second curved block 42 is opposite to an opening of the first curved block 32, and the second curved block 42 is swung along the second curved track 225.

The first torsion unit 5 is adjacently provided on the first lateral surface 211 of the first lateral plate 21 of the curved base 2, and the first torsion unit 5 is formed by transversely stacking a plurality of first plates 51, and two ends of first torsion unit 5 are respectively provided with a first pivoting hole 52 and a first pivoting-connection hole 53. The first pivoting hole 52 is in communication with a first elongated opening hole 54. A first tooth portion 55 is provided around peripheries of the first pivoting hole 52. The second torsion unit 6 is formed by transversely stacking a plurality of second plates 61. The second torsion unit 6 is symmetrical with the first torsion unit 5 and they are simultaneously and adjacently provided on first lateral surface 211 of the curved body 2. Two ends of the second torsion unit 6 are respectively provided with a second pivoting hole 62 and a second pivoting-connection hole 63, and the second pivoting hole 62 is in communication with the second elongated hole 64. A second tooth portion 65 is provided around peripheries of the pivoting hole 62, and the second tooth portion 65 is engaged with the first tooth portion 55.

The third torsion unit 7 is symmetrical with the fourth torsion unit 8 and they are simultaneously and adjacently provided on the second lateral surface 231 of the second lateral plate 23 of the curved base 2, wherein the third torsion unit 7 also includes a plurality of third plate 71 that are transversely stacked. Two ends of the third torsion unit 7 are respectively provided with a third pivoting hole 72 and a third pivoting-connection hole 73. The third pivoting hole 72 is in communication with a third elongated opening hole 74. A third tooth portion 75 is provided around the peripheries of the third pivoting hole 72. The fourth torsion unit 8 also includes a plurality of fourth plates 81 that are transversely stacked. Two ends of the fourth torsion unit 8 are respectively provided with a fourth pivoting hole 82 and a fourth pivoting-connection hole 83, and a fourth pivoting-connection hole 83, and the fourth pivoting hole 82 is in communication with a fourth elongated opening hole 84, and a fourth tooth portion 85 is provided around peripheries of the fourth pivoting hole 82, and the fourth tooth portion 85 is engaged with the third tooth portion 75.

A first pivoting shaft 93 is sequentially passed through the first pivoting-connection hole 53 of the first torsion unit 5, the elongated first guiding groove 311 of the first connecting portion 31, and the third pivoting-connection hole 73 of the third torsion unit 7, thereby the first pivoting shaft 93 is pivotally connected to the first pivoting-connection hole 53 and the third pivoting-connection hole 73 so that the first pivoting shaft 93 is moveable within the elongated first guiding groove 311. A second pivoting shaft 94 is sequentially passed through the second pivoting-connection hole 63 of the second torsion unit 6, the elongated second guiding groove 411 of the second connecting portion 41, and the fourth pivoting-connection hole 83 of the fourth torsion unit 8, thereby the second pivoting shaft 94 is pivotally connected to the second pivoting-connection hole 63 and the fourth pivoting-connection hole 83, so that second pivoting shaft 94 is moveable within the elongated second guiding groove 411. A first shaft 95 has a first stopping portion 951. Two ends of the first shaft 95 are respectively provided with a first shaft end 952 and a third shaft end 953. The first shaft end 952 is axially connected to the first pivoting hole 52 of the first torsion unit 5. The third shaft end 953 is axially connected to the third pivoting hole 72 of the third torsion unit 7. The middle portion of the first shaft 95 is passed through the intermediate curved block 22 and is limited to the limiting groove 226 of the curved body 221 by the first stopping portion 951, thereby the first shaft 95 is positioned in the intermediate curved block 22 in an irrotational way. The second shaft 96 has a second stopping portion 961. The two ends of the second shaft 96 are respectively provided with a second shaft end 962 and a fourth shaft end 963. The second shaft end 962 is connected axially to the second pivoting hole 62 of the second torsion unit 6, and the fourth shaft end 963 is axially connected to the fourth pivoting hole 82 of the fourth torsion unit 8. The middle portion of the second shaft 96 is passed through the intermediate curved block 22 and is limited in the limiting groove 226 of the curved body 221 by the second stopping portion 961, thereby the second shaft 96 is positioned in the intermediate curved block 22 in an irrotational way.

Figure 1:
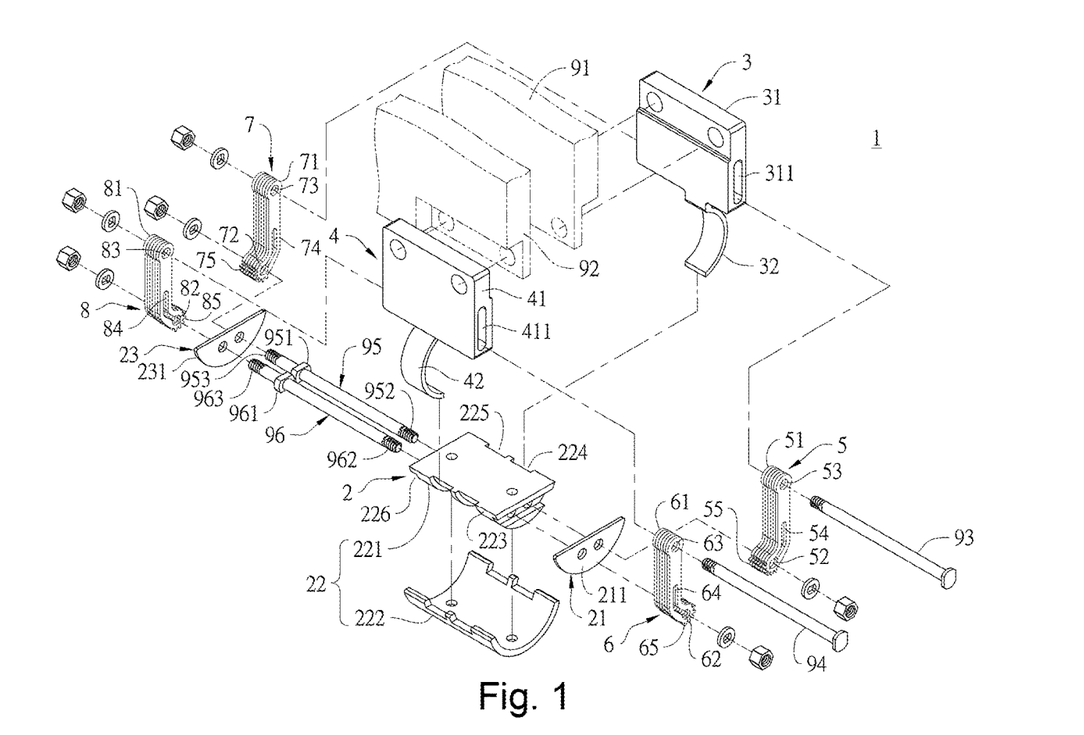
FIG. 1 is an exploded view of the preferred embodiment of the present invention.
Figure 2:
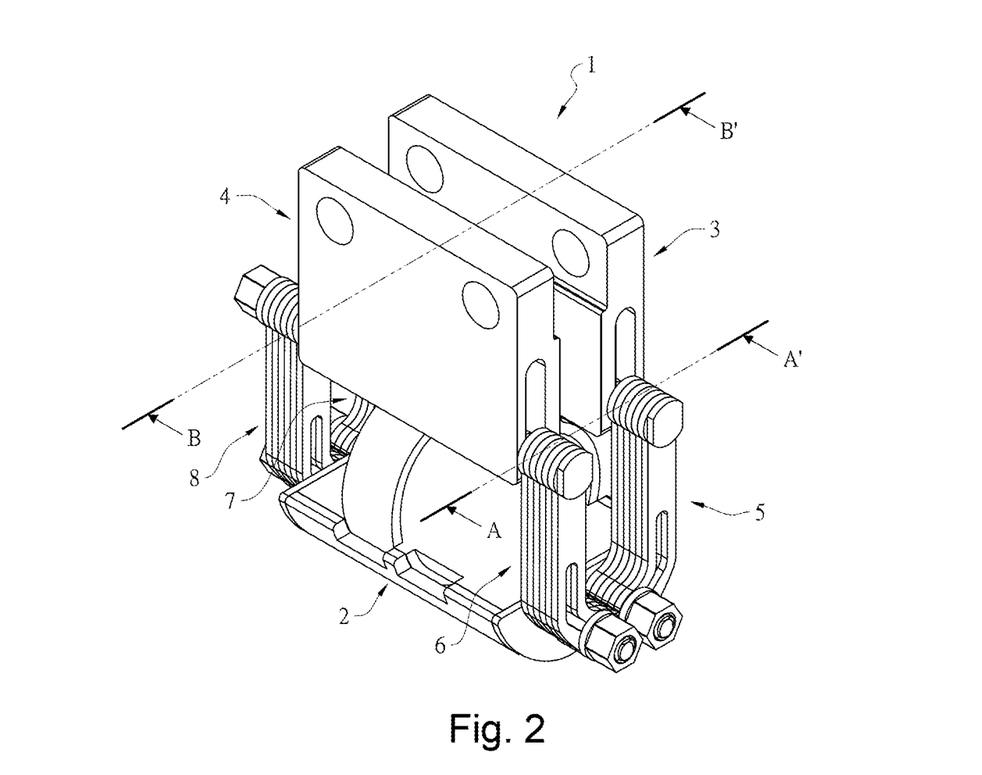
FIG. 2 is a perspective view of a preferred embodiment of the present invention.
Figure 3:
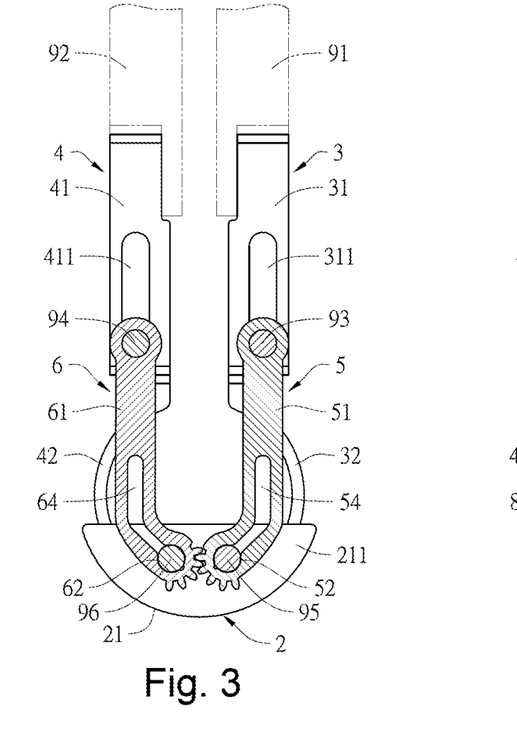
FIG. 3 is a cross-sectional view taken along line A-A' of FIG. 2.
Figure 4:
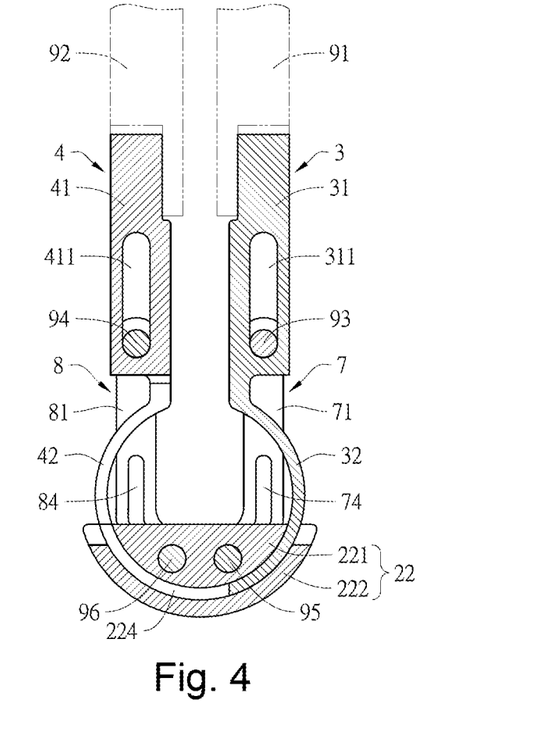
FIG. 4 is a cross-sectional view taken along line B-B' of FIG. 2.
Figure 5:
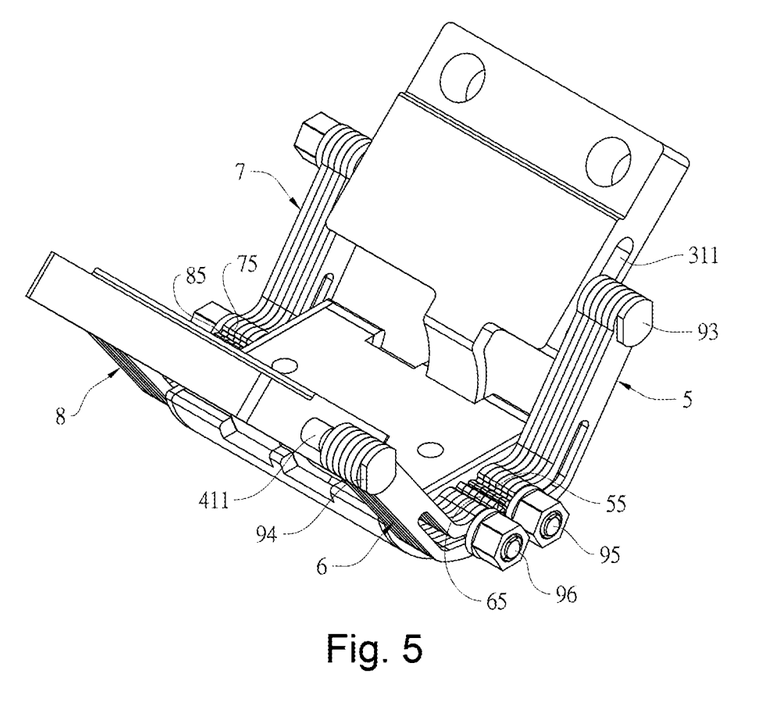
FIG. 5 is a schematic perspective view of the preferred embodiment of the present invention in a half-folding state.
Figure 6:
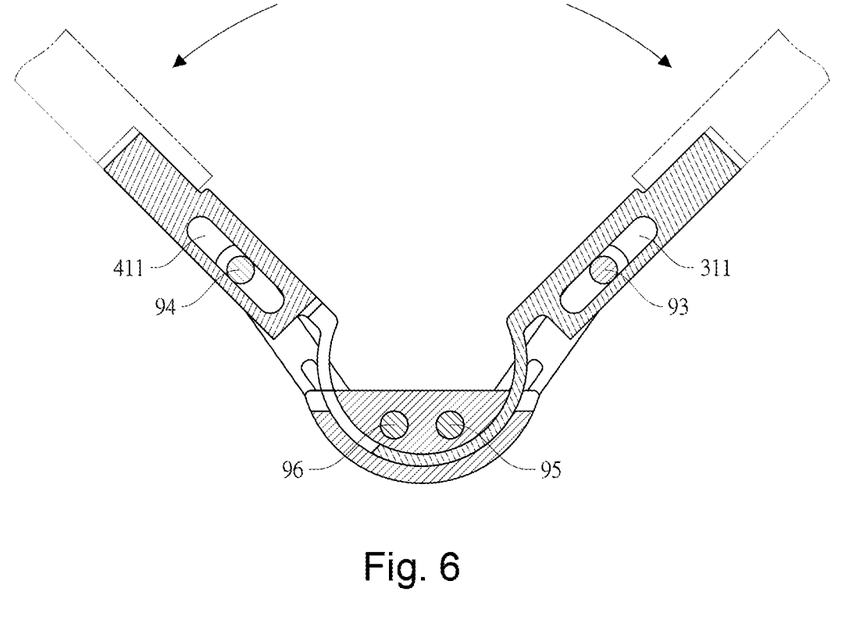
FIG. 6 is a schematic cross-sectional view showing a preferred embodiment of the present invention in a half-folding state.
Figure 7:
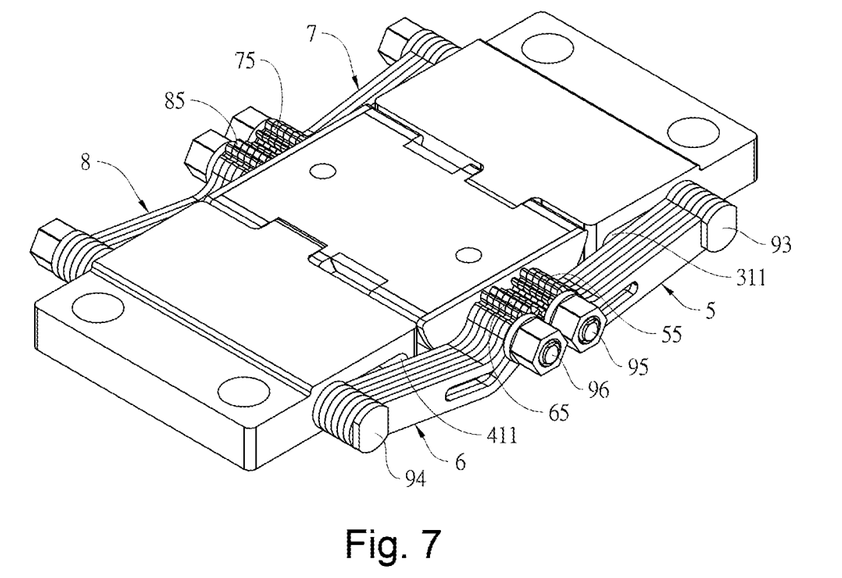
FIG. 7 is a schematic perspective view of the preferred embodiment of the present invention when being fully unfolded.
Figure 8:
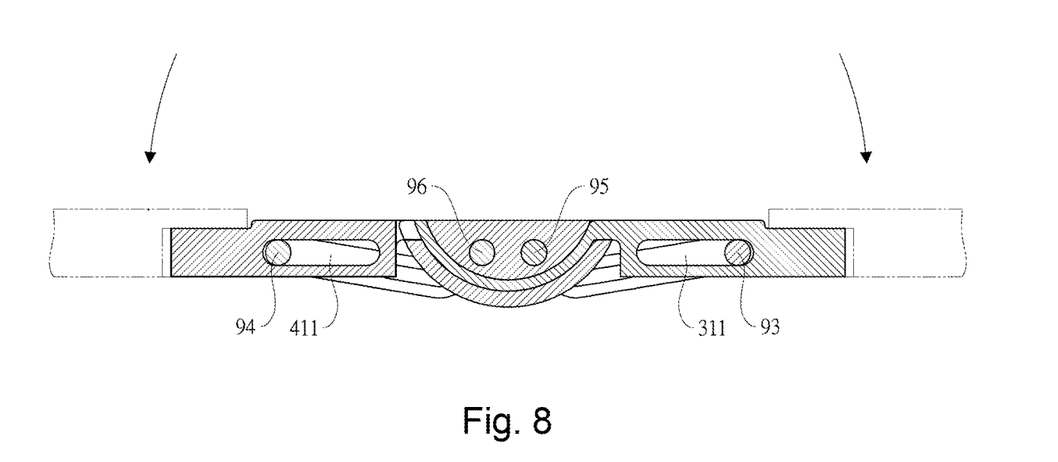
FIG. 8 is a schematic cross-sectional view of the preferred embodiment of the present invention when being fully unfolded.

In one embodiment, the first shaft end 952 and the second shaft end 962 may be formed by being transversely extended from the first lateral surface 311 of the curved seat base 22 to be respectively pivotally connected to the first pivoting hole 52 of the first torsion unit 5 and the second pivoting hole 62 of the second torsion unit 6. The third shaft end 953 and the fourth shaft end 963 may also be formed by being extended transversely from the second lateral surface 231 of the curved seat body 22 to be respectively axially connected to the third pivoting hole 72 of the third torsion unit 7 and the fourth pivoting hole 82 of the fourth torsion unit 8. There may be two first stopping portion 951 of the first shaft 95 and the second stopping portion 961 of the second shaft 96 respectively provided to be limited in the limiting grooves 226 on the two sides of the curved body 221.

Thus, as shown in FIGS. 1 and 5-8, when the display relative to the base and two parallel brackets of the dual-touch screen computer are rotated to be fully folded or fully unfolded at an angle of about 180 degrees, the two parallel brackets are synchronously moved in a linkage way as a result that the first tooth portion 55 of the first torsion unit 5 is engaged with the second tooth portion 65 of the second torsion unit 6, and the third tooth portion 75 of the third torsion unit 7 is engaged with the fourth tooth portion 85 of the fourth torsion unit 8. In this way, the first pivoting shaft 93 and the second pivoting shaft 94 are respectively moved in the elongated first guiding groove 311 and the elongated second guiding groove 411. Then, the first pivoting hole 52 of the first torsion unit 5 and the third pivoting hole 72 of the third torsion unit 7 are rotated synchronously and respectively with the first shaft end 952 and the third shaft end 953 of the first shaft 95 in a frictional way to generate torque, and the second pivoting hole 62 of the second torsion unit 6 and the fourth pivoting hole 82 of the fourth torsion unit 8 are synchronously and respectively rotated with the second shaft end 962 and the fourth shaft 963 end of the second shaft 96 to generate torque, thereby the generated torque can be stably maintained within a preset range at each rotation angle, so that the display and the base or the two parallel brackets of the dual-touch screen computer can be stably rotated in a reverse direction and can be freely maintained at certain angles when being rotated.

Accordingly, the present invention has following advantages:

1. The first torsion unit and the second torsion unit of the present invention are respectively implemented by means of respectively stacking a plurality of first plates and a plurality of second plates, which can increase or decrease the overall thickness according to practical need or specifications, so as to adjust the torque. Therefore, such arrangement not only helps to reduce the overall volume but also does not occupy space and is also beneficial to the overall design of the electronic device, so as to meet market demand of being lighter and thinner, and to easily adjust the structural strength. Furthermore, the first and second torsion units are provided onto the outer surface, so as to improve the adjustment of the torsion force, and they are further used as the "linkage bar" to produce movement in a linkage way. The two ends of the first and second torsion units are respectively provided with "pivoting hole" and "pivoting-connection hole", "the pivoting hole" at one end is in communication with an elongated opening hole, which can be elastically adjusted when "the shaft" is passed through it. "The toothed portion" is provided around the peripheries of the "pivoting hole", which can produce the technical effect of forming a synchronous motion when the present invention is rotated in a reverse direction, and such arrangement is able to assist each "curved block" to provide support function.

2. The third torsion unit and the fourth torsion unit of the present invention can be selectively used to make the third and fourth torsion units symmetrical with the first torsion unit and the second torsion unit, so as to produce friction torque and share the load synchronously. Moreover, in addition that the four torsion units can be manufactured by means of stacking plurality of sheets, the four torsion units also can be integrally manufactured according to practical situation, so as to increase flexibility in use.

3. Each "connecting portion" of the present invention is provided with "the elongated guiding groove", and "the pivoting shaft" is respectively passed through each "elongated guiding groove" and the opposite ends of each "torsion unit", and can be slide along each "elongated guiding groove". The "first shaft" and the "second shaft" are respectively provided with "the stopping portion". After passing through "the intermediate curved block", each "stopping portion" is limited to the "groove" of the intermediate curved block, so as to produce a technical effect of non-rotation, thereby the "first and second torsion units" can respectively generate rotational friction relative to the two shafts.

4. The present invention simplifies the structure of the movable plate, so as to reduce the thickness of each curved block and the size of the corresponding curved seat body, thereby reducing the overall thickness to bring advantages to designs and meeting the market requirements of being thinner and lighter to promote sale amounts. Moreover, according to the present invention, the numbers of the components can be reduced, so as to improve production costs.

The description referred to in the drawings and stated above is only for the preferred embodiments of the present invention. Many equivalent variations and modifications can still be made by those skilled in the field of the present invention without departing from the spirit of the present invention, so they should be regarded to fall into the scope defined by the appended claims

What is claimed is:

1. A hidden type split hinge, comprising:

an curved seat body, provided with a first lateral surface and a second lateral surface opposite to the first lateral surface, wherein a first curved track and a second curved track are juxtaposed with and spaced from each other between the first lateral surface and the second lateral surface, and the first curved track and the second curved track have openings respectively in the same direction, and the first lateral surface has a first shaft end and a second shaft end;

a first rotating member, including a first connecting portion and a first curved block, wherein the first connecting portion is connected to a first bracket, and the first connecting portion is provided with an elongated first guiding groove, and the first curved block is limited in and swung along the first curved track in a way of being relatively swung;

a second rotating member, including a second connecting portion and a second curved block, wherein the second connecting portion is connected to a second bracket, and the second connecting portion is provided with an elongated second guiding groove, and the second curved block is limited in the second curved track in a way of being relatively swung;

a first torsion unit, adjacently provided on the first lateral surface of the curved seat body, wherein a first pivoting hole and a first pivoting-connection hole are respectively provided at two ends of the first torsion unit, and the first pivoting hole is in communication with a first elongated opening hole, and a first tooth portion is provided around peripheries of the first pivoting hole, the first pivoting hole is axially connected to the first shaft end, and a first pivoting shaft is passed through the first pivoting-connection hole and the elongated first guiding groove of the first connecting portion; and a second torsion unit, symmetrical with the first torsion unit and adjacently provided on the first lateral surface of the curved seat body, wherein a second pivoting hole and a second pivoting-connection hole are respectively provided at two ends of the second torsion unit, wherein the second pivoting hole is in communication with a second elongated opening hole, and a second tooth portion is provided around peripheries of the second pivoting hole, and the second tooth portion is engaged with the first tooth portion, and the second pivoting hole is axially connected to the second shaft end, a second pivoting shaft is passed through the second pivoting-connection hole and the elongated second guiding groove of the second connecting portion.

2. The hidden type split hinge according to claim 1, wherein the curved seat body includes a first lateral plate, an intermediate curved block and a second lateral plate that are sequentially connected, and the intermediate curved block is provided with the first curved track and the second curved track juxtaposed with and spaced from each other.

3. The hidden type split hinge according to claim 2, wherein the intermediate curved block comprises a curved body and a cover plate, and the curved body is provided with an curved surface, and the first curved track and the second curved track are two grooves formed on the curved surface, and the cover plate covers and is connected to the curved surface.

4. The hidden type split hinge according to claim 2, wherein the first shaft end and the third shaft end are respectively provided at two ends of the first shaft, and the first shaft is passed through the intermediate curved block, and the first shaft has a middle portion positioned in the intermediate curved block in an irrotational way.

5. The hidden type split hinge according to claim 4, wherein the first shaft is provided with at least one first stopping portion, and at least one of two sides of the intermediate curved block is provided with a limiting groove for limiting the at least one first stopping portion, thereby the middle portion of the first shaft is positioned in the intermediate curved block in an irrotational way.

6. The hidden type split hinge according to claim 1, wherein the second lateral surface of the curved seat body is provided with a third shaft end and a fourth shaft end, and a third torsion unit is adjacently provided on the second lateral surface of the curved seat body, and a third pivoting hole and a third pivoting-connection hole are respectively provided at the two ends of the third torsion unit, the third pivoting hole is in communication with a third elongated hole, and a third tooth portion is provided around peripheries of the third pivoting hole, and the third pivoting hole is axially connected with the third shaft end, and the first pivoting shaft is passed through the third pivoting-connection hole; a fourth torsion unit is symmetrical with the third torsion unit and adjacently provided on the second lateral surface of the curved seat body, a fourth pivoting hole and a fourth pivoting-connection hole are respectively provided at two ends of the fourth torsion unit; wherein the fourth pivoting hole is in communication with a fourth elongated opening hole, and a fourth tooth is provided around peripheries of the fourth pivoting hole, and the fourth tooth portion is engaged with the third tooth portion, the fourth pivoting hole is axially connected with the fourth shaft end, and the second pivoting shaft is passed through the fourth pivoting-connection hole.

7. The hidden type split hinge according to claim 6, wherein the curved seat body includes a first lateral plate, an intermediate curved block and a second lateral plate that are sequentially connected, and the intermediate curved block is provided with the first curved track and the second curved track juxtaposed with and spaced from each other.

8. The hidden type split hinge according to claim 7, wherein the second shaft end and the fourth shaft end are respectively provided at two ends of a second shaft, the second shaft is passed through the intermediate curved block, and the second shaft has a middle portion positioned in the intermediate curved block in an irrotational way.

9. The hidden type split hinge according to claim 8, wherein the second shaft is provided with at least one second stopping portion, and at least one of the two sides of the intermediate curved block is provided with a limiting groove for limiting the at least one second stopping portion, thereby the middle portion of the second shaft is positioned in the intermediate curved block in an irrotational way.

10. The hidden type split hinge according to claim 6, wherein the third torsion unit includes a plurality of third plates that are transversely stacked, and the fourth torsion unit includes a plurality of fourth plates that are transversely stacked.

11. The hidden type split hinge according to claim 1, wherein the first torsion unit includes a plurality of first plates that are transversely stacked, and the second torsion unit includes a plurality of second plates that are transversely stacked.

12. The hidden type split hinge according to claim 1, wherein the second rotating member and the first rotating member are provided correspondingly on opposite lateral edges of the curved seat body, thereby an opening of the second curved block is opposite to an opening of the first curved block.

* * * * *